June 7, 1960
R. L. BEEKMAN
2,939,671
MAGNETIC HOLDER
Filed Nov. 13, 1958
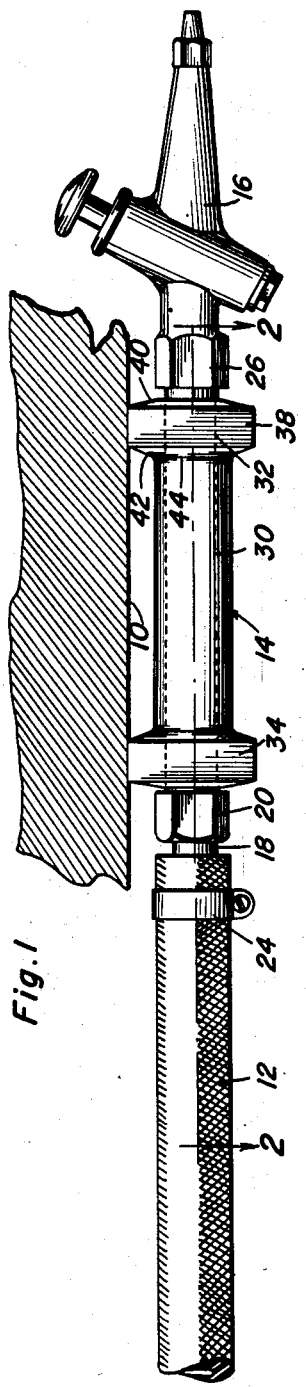
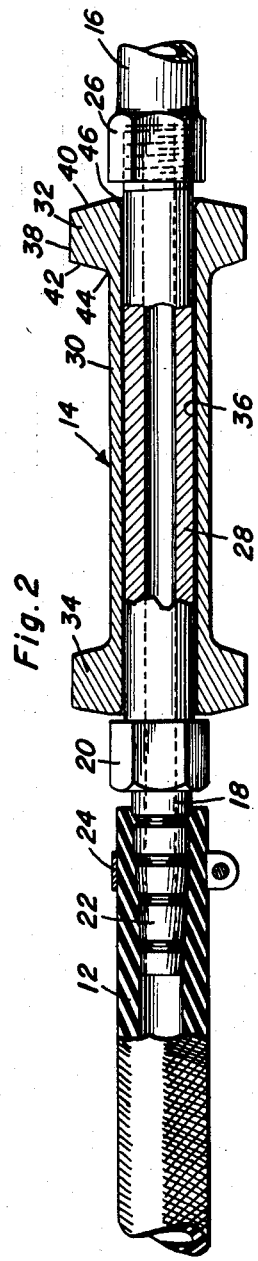
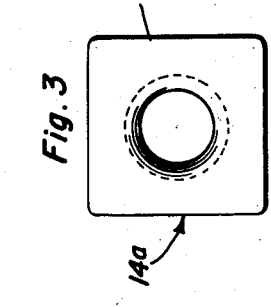
Robert L. Beekman
INVENTOR.
BY
*Attorneys*

2,939,671
MAGNETIC HOLDER

Robert L. Beekman, 811 SW. 6th St., Fort Lauderdale, Fla.

Filed Nov. 13, 1958, Ser. No. 773,657

6 Claims. (Cl. 248—360)

This invention relates to a magnetic holder for elongate objects and more particularly to a magnetic holder for hoses, tubes and similar objects.

Although the principles of the invention are widely applicable to many fields of endeavor one of the principal uses of the invention is in connection with the convenient supporting of air hose adjacent to a machine tool. The magnetic holder, applied to such a hose, makes it possible for the machinist to use the air hose and merely move it to a position close to a metal part of the machine or in contact with a metal part of the machine and then release the magnetic holder. The magnetic holder attaches to the machine any place that the machinist wishes to have the hose. This avoids the necessity of hooks, hangers and the like and the more exacting task of hanging the hose on the hook. Furthermore, the invention has the distinct advantage of enabling the machinist to place the hose in a much more convenient location depending on his wishes.

A more specific object of the invention is to provide a magnetic holder for a hose or the like, the magnetic holder consisting essentially of a sleeve with enlarged ends and a bore extending completely through the sleeve. A part of the hose extends through the bore and this part of the hose is preferably made of a non-magnetic substance, for example brass, bronze, zinc alloy die casting, aluminum, etc. In this way the holder is freely rotatable on the hose so that if a machinist or anyother person wishes to rest a hose on a supporting surface, regardless of the angularity of the surface, the hose is free to turn in the holder. Often hoses have loops or half-loops in them which will tend to twist the holder. Such twisting action is permissible inasmuch as the part of the hose in the holder is capable of freely rotating with respect to the holder.

The magnetic holder may be constructed of Alnico material that is longitudinally magnetized so that a sleevelike object has north and south poles respectively at the ends thereof. With these ends made enlarged and of a smaller cross-sectional area than the main body of the sleeve, the flux density is concentrated at the enlarged ends thereby increasing the holding action on a magnetizable surface. Other magnetization improving features include fillets and chamfering at the junction of the enlargements at the ends of the sleeve and at the ends of the bore respectively. Further, the enlargements at the ends of the sleeve are preferably tapered to a smaller outer area to further aid in more favorable magnetic properties.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary elevational view of a typical hose equipped with a holder constructed in accordance with the invention.

Figure 2 is a longitudinal sectional view taken on the line 2—2 of Figure 1.

Figure 3 is an end view of a modification of the holder.

Figure 4 is an end view of another modification of the holder.

In the accompanying drawing there is a supporting surface 10 made of magnetizable material, for instance iron or steel as would be found in the frame of a machine tool. Hose 12 diagrammatically represents any elongate object capable of being supported by magnetic holder 14. For example, the hose 12 may be an air hose having a conventional valve operated nozzle 16 at its extremity. The hose has a fitting 18 provided with a nut 20 at one end and a tapered sleeve 22 at the other end disposed in the bore of the hose. A clamp 24 is attached to the hose, embracing a part of it and pressing it firmly against the tapered sleeve 22 of fitting 18. Nozzle 16 has an internally threaded socket 26 at one end, and there is a nonmagnetic tube 28 threaded into socket 26 and nut 20 thereby coupling the nozzle 16 with the fitting 18 of hose 12. Holder 14 is mounted for free rotation on the non-magnetic sleeve 28. It is preferred that the magnetic holder be constructed of a single body 30 shaped as a sleeve having enlargements 32 and 34 at the ends. The body has a passage or bore 36 extending completely through it, and it is this passage that accommodates sleeve 28. The enlargements 32 and 34 are each approximately toroidal, being formed as rings with an outer surface 38, and side walls 40 and 42 respectively on each. The side walls are tapered so that surface 38 is of an area less than the cross-sectional area of the enlargement at a place closer to the intermediate part of body 30. Further, there is a fillet 44 at the juncture of wall 42 and the surface of the main part of body 30, and a chamfer 46 at the inner corner of enlargement 32. The chamfer, fillet and taper of each enlargement cooperate to increase the concentration of flux at the surface 38. The magnetic body is preferably an Alnico magnet which is longitudinally magnetized so that the enlargements constitute north and south poles respectively.

Figure 3 shows an enlargement 50 which is square, while Figure 4 shows an enlargement 52 which is triangular with clipped corners 54. These views are intended to show that the shape of the enlargement may be varied through a wide range depending on manufacturing and sales requirements. The square enlargements 50 have the advantage of providing a plurality of flat surfaces for engagement with flat supporting surfaces, and they inhibit rolling. The same holds true for the triangular enlargement 52, except that there are only three surfaces provided in the triangular shape. The remainder of the holders 14a and 14b of Figures 3 and 4 are identical to the holder 14 both in construction and purpose.

The use of the invention has been described previously. However, many other uses and objects, apart from hose 12, with which the holders may be used, will become readily apparent to those skilled in many arts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A magnetic holder in combination with an elongate object in which a part of the object has a non-magnetic characteristic, said holder comprising an elongate body, enlargements at the ends of said elongate body, said holder having a passage in which said non-magnetic part is freely rotatably disposed, and said elongate body being magnetized with the enlargements constituting poles for attraction to a supporting surface to which a magnet adheres.

2. A magnetic holder in combination with an elongate flexible object in which a part of the object has a non-magnetic characteristic, said holder comprising an elongate body, enlargements at the ends of said elongate body, said holder having a passage in which said non-magnetic part is freely rotatably disposed, said elongate body being magnetized with the enlargements constituting poles for attraction to a supporting surface to which a magnet adheres, and said enlargements having fillets at their juncture with the intermediate part of said elongate body and being tapered so that the outer surface of each enlargement is of a comparatively small area to thereby increase the flux density at said enlargement surfaces.

3. In a magnetic holder in combination with an elongate object in which a part of the object has a non-magnetic characteristic, said holder comprising an elongate body, enlargements at the ends of said elongate body, said holder having a longitudinally extending passage in which said non-magnetic part is freely rotatably disposed, said elongate body being magnetized with the enlargements constituting poles for attraction to a supporting surface to which a magnet adheres, said enlargements having fillets at their juncture with the intermediate part of said elongate body and being tapered so that the outer surface of each enlargement is of a comparatively small area to thereby increase the flux density at said enlargement surfaces, and means consisting of chamfers at the ends of said passage for further increasing the flux density of said surfaces of said enlargements.

4. The holder of claim 3, wherein said enlargements are essentially toroidal.

5. The holder of claim 3, wherein said enlargements are substantially square in shape.

6. The holder of claim 3, wherein said enlargements are substantially triangular in configuration.

References Cited in the file of this patent

UNITED STATES PATENTS

| | | |
|---|---|---|
| 824,812 | Plimpton | July 3, 1906 |
| 2,353,550 | De Forest | July 11, 1944 |
| 2,594,955 | Markowitz | Apr. 29, 1952 |